United States Patent [19]

Eastmond et al.

[11] Patent Number: 5,675,020
[45] Date of Patent: Oct. 7, 1997

[54] ORTHO-BIS(ETHERDIANHYDRIDES)

[75] Inventors: Geoffrey Charles Eastmond, Higher Bebington; Jerzy Paprotny, Liverpool, both of United Kingdom

[73] Assignee: The University of Liverpool, Liverpool, England

[21] Appl. No.: 440,956

[22] Filed: May 15, 1995

Related U.S. Application Data

[62] Division of Ser. No. 235,572, Apr. 29, 1994, Pat. No. 5,434,241.

[51] Int. Cl.$^6$ .......................... C07D 307/77; C07D 307/91
[52] U.S. Cl. ..................... 549/241; 549/242; 549/243
[58] Field of Search ........................ 549/241, 242, 549/243

[56] References Cited

U.S. PATENT DOCUMENTS

| Re. 31,805 | 1/1985 | Takekoshi | 528/206 |
|---|---|---|---|
| 3,787,475 | 1/1974 | Heath et al. | |
| 3,847,867 | 11/1974 | Heath et al. | |
| 3,879,428 | 4/1975 | Heath et al. | 260/346.3 |
| 4,324,882 | 4/1982 | Takekoshi | 528/206 |
| 4,540,748 | 9/1985 | Matzner et al. | 525/420 |
| 4,720,540 | 1/1988 | Maresca et al. | 528/482 |
| 4,769,439 | 9/1988 | Talley et al. | 528/176 |
| 5,340,904 | 8/1994 | Yang et al. | 528/185 |

OTHER PUBLICATIONS

Takekoshi, T. et al, *J. Poly. Sci., Poly. Symp.*, 74, 93–108, 1986.
Yang, C.P. et al, *Macromolecules*, 26, 4865–4871, Feb./May 1993.
Yang, C.P. et al, *J. Polym. Sci., Part A*, 32, 435–444, 1994.
Marcuccio, S.M. et al, *Can. J. Chem.*, 63, 3057–3069, Mar. 1985.
Eastmond, G.C. et al, *Polymer*, 34(13), 2865–2874, Jul. 27, 1993.
Eastmond, G.C. et al, *Polymer*, 34(3), 667–670, Feb. 24, 1993.
Chin–Ping Yang et al. *Makromol. Chem.* 194, 1595–1605 (Jun., 1993).

*Primary Examiner*—James J. Seidleck
*Assistant Examiner*—P. Hampton-Hightower

[57] ABSTRACT

Disclosed herein are novel poly(imide-ethers) containing ortho substitution in the main chain of the polymer. These polymers are made from novel aromatic bis-carboxylic anhydrides which contain two ether groups attached to an aromatic ring in ortho positions to each other. The polymers are particularly useful for films, fibers and encapsulation, as well as thermoplastics.

6 Claims, No Drawings

ORTHO-BIS(ETHERDIANHYDRIDES)

This is a division of application Ser. No. 08/235,572, filed Apr. 29, 1994, now U.S. Pat. No. 5,434,241.

FIELD OF THE INVENTION

Disclosed herein are aromatic poly(imide-ethers) which are derived from novel aromatic bis-carboxylic anhydrides which contain two ether groups bonded to an aromatic ring in an ortho position.

TECHNICAL BACKGROUND

Poly(imide-ethers) are a known class of polymers, some of which are sold commercially for use as, for instance, thermoplastics for injection molding parts. Therefore such polymers with particularly useful properties are sought by the artisan.

U.S. Pat. Nos. 3,847,867, 3,787,475, 4,769,439, and T. Takekoshi, et al., J. Poly. Sci., Poly. Symp., vol. 74, p. 93–108 (1986) describe certain poly(imide-ethers). In none of these references are polymers with ether linkages bound ortho to each other to an aromatic ring specifically disclosed.

U.S. Pat. No. 3,879,428 and Takekoshi, et al., (see above) describe the preparation of certain bis-carboxylic anhydrides which also contain ether linkages. No such compounds are specifically described in which ether linkages are bound ortho to each other to an aromatic ring.

C. P. Yang, et al., Macromolecules, vol. 26, p. 4865 to 4871 (1993) and C. P. Yang, et al., J. Polym. Sci., Part A, vol. 32, p. 435–444 (1994) describe the synthesis of certain ortho substituted diaminoethers which are converted into poly (imide-ethers) or poly(imide-amide-ethers). Poly(imide-ethers) from othro substituted dicarboxylic anhydrides are not mentioned.

SUMMARY OF THE INVENTION

This invention concerns, a poly(imide-ether) which comprises the repeat unit

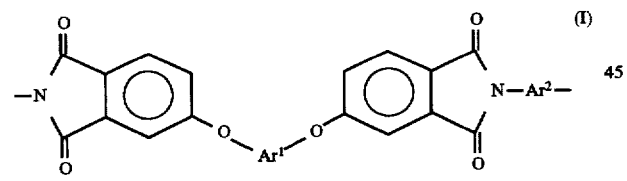

(I)

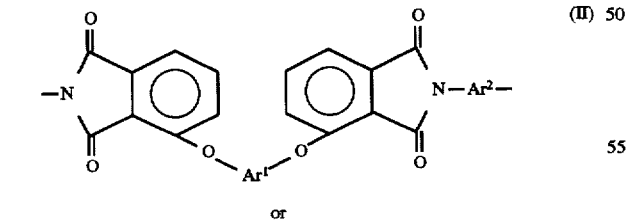

(II)

or

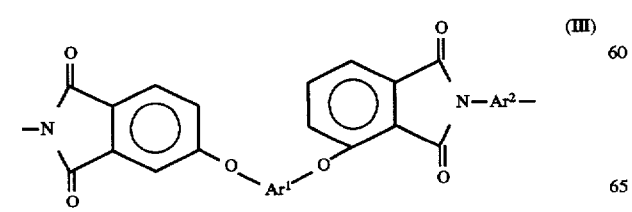

(III)

wherein:

$Ar^1$ is 1,2-naphthylene, 2,3-naphthylene or

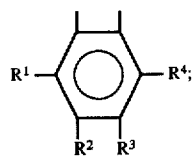

$Ar^2$ is an arylene radical containing one or more aromatic rings; and $R^1$, $R^2$, $R^3$, and $R^4$ are each independently hydrogen, chlorine, fluorine, alkyl containing 1 to 10 carbon atoms, or phenyl.

This invention also concerns a compound of the formula

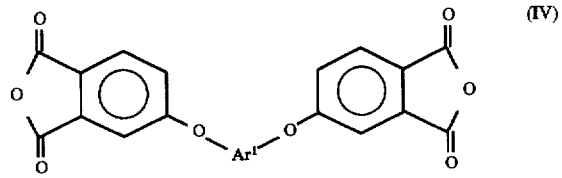

(IV)

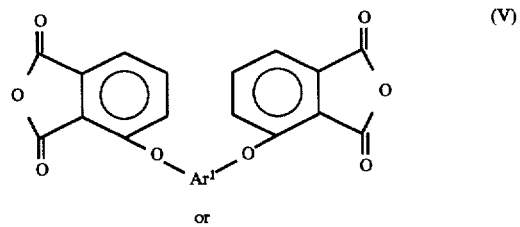

(V)

or

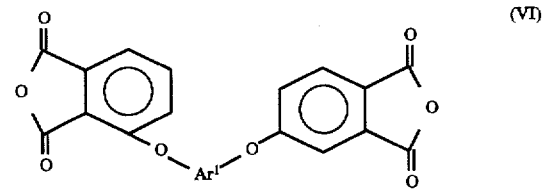

(VI)

wherein:

$Ar^1$ is 1,2-naphthylene, 2,3-naphthylene or

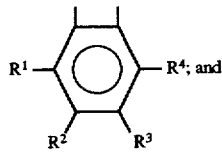

$R^1$, $R^2$, $R^3$, and $R^4$ are each independently hydrogen, fluorine, chlorine, alkyl containing 1 to 10 carbon atoms, or phenyl.

DETAILS OF THE INVENTION

The poly(imide-ethers) described herein are made from the novel bis-carboxylic anhydrides of formulas (IV), (V) and (VI). The preparation of some anhydrides of formulas (IV) and (V) are found in Examples 1 through 7, and these and other methods are also described in T. Takekoshi, et al., above. Preparation of the anhydride of formula (VI) can be done by using a mixture of 3-nitrophthalonitrile and 4-nitrophthalonitrile in the reaction with catechol or a catechol derivative. As the art skilled will recognize, a mixture of bis-carboxylic anhydrides of formulas (IV), (V) and (VI) will be obtained. These may be separated by conventional means, such as fractional crystallization. Anhydrides of formulas (IV) and (V) are preferred.

Bis-carboxylic anhydrides with various groups other than hydrogen for $R^1$, $R^2$, $R^3$ and/or $R^4$ can be obtained by using procedures similar to those in these Examples, but starting with an appropriately substituted catechol. All of the following preferred structures are applicable to both the bis-carboxylic anhydrides and poly(imide-ethers) claimed herein. It is preferred if $Ar^1$ is substituted or unsubstituted 1,2-phenylene. It is also preferred if:

$R^1$, $R^2$, $R^3$, and $R^4$ are hydrogen;
$R^1$ and $R^3$ are hydrogen and $R^2$ and $R^4$ are t-butyl;
$R^1$, $R^3$ and $R^4$ are hydrogen and $R^2$ is t-butyl;
$R^1$ is methyl and $R^2$, $R^3$ and $R^4$ are hydrogen;
$R^1$, $R^3$ and $R^4$ are hydrogen and $R^2$ is methyl; or
$R^1$ is fluorine and $R^2$, $R^3$ and $R^4$ are hydrogen.

It is also preferred if:

$R^1$ is alkyl and $R^2$, $R^3$ and $R^4$ are hydrogen;
$R^1$, $R^3$ and $R^4$ are hydrogen and $R^2$ is alkyl; or
$R^1$ and $R^3$ are alkyl, and $R^2$ and $R^4$ are hydrogen.

It is especially preferred if $R^1$, $R^2$, $R^3$, and $R^4$ are hydrogen. It is preferred if these alkyl groups contain 1 to 4 carbon atoms.

The poly(imide-ethers) may be produced by reacting the instant bis-carboxylic anhydrides (or their precursor tetracarboxylic acids) with an aromatic diamine of the formula $H_2N-Ar^2-NH_2$, wherein $Ar^2$ is the same $Ar^2$ in the formula of the poly(imide-ether) repeat unit (an alternate method is the reaction of the bis-carboxylic anhydride with a diisocyanate). $Ar^2$ is an arylene radical whose two free bonds are on (or connect to) a carbon atom of an aromatic ring. Each of these free bonds may be to the same or different aromatic rings, and $Ar^2$ contains one or more aromatic rings. These rings may be fused, connected by covalent bonds, and/or connected through inert groups. Suitable radicals for $Ar^2$ include 1,4-phenylene, 1,3-phenylene, 4,4'-biphenylene, 3,4'-biphenylene, 3,3'-biphenylene, 2,4'-biphenylene, 2,2'-biphenylene, 2,6-naphthylene,

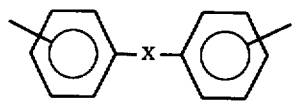

wherein X is alkylene, alkylidene, —S—, —O—, —C(CF$_3$)$_2$— and —SO$_2$—, and

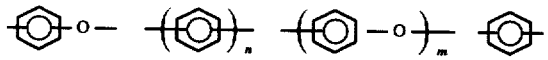

wherein n is 0 or 1 and m is 0, 1 or 2, provided that each of the benzene rings is meta or para substituted by the bond or groups connecting the rings. Preferred groups for $Ar^2$ are 1,4-phenylene, 1,3-phenylene, or

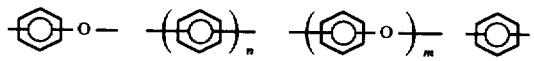

After the bis-carboxylic anhydride is reacted with the diamine (to form a polyamic acid), the polyamic acid is converted to the poly(imide-ether) by heating and/or chemical means. These types of reactions are well known to the artisan, see for instance the U.S. Patents mentioned above, B. Elvers, et al., Ed., Ullamnn's Encyclopedia of Industrial Chemistry, vol. A21, VCH Verlagsgesellschaft mbH, Weinheim, 1992, p. 253–272, and Examples 17 to 45 herein.

The polymers herein may be copolymers, that is contain different $Ar^2$ groups, may be derived from more than one of the above anhydrides, or may contain polyimide and/or poly(imide-ether) repeat units which are derived from amines and/or carboxylic anhydrides different from those disclosed herein.

Given the fact that the poly(imide-ethers) herein contain an ortho substituted group ($Ar^1$) in the polymer chain, many of them surprisingly have relatively high glass transition temperatures (Tg), in some cases about the same Tg's as the analogous meta substituted poly(imide-ethers), see Table 7 in the Examples. This is often combined with good solubility at ambient temperatures in common organic solvents (the analogous meta and para substituted polymers are often much less soluble under these conditions), making the instant polymers particularly useful for coatings, fibers, films and for encapsulation resins. Certain of the instant polymers may also be used for typical thermoplastic uses, such as molding parts or for wire insulation. Some of these polyimides are also colorless.

EXAMPLE 1

Preparation of 1,2-bis-(3,4-dicyanophenoxy) benzene 51.9 g (0.3 moles) of 4-nitrophthalonitrile was dissolved in 200 ml anhydrous dimethyl sulphoxide (DMSO) in a 500 ml three-necked flask fitted with a stirrer, nitrogen-gas inlet and thermometer. 16.5 g (0.15 moles) of catechol (supplied by Aldrich) was added to the mixture followed by 23 g of anhydrous potassium carbonate. The mixture was stirred at room temperature with a stream of dry, oxygen-free nitrogen passing through the flask for 20 hours. After that time an additional 2 g (0.011 moles) of 4-nitrophthalonitrile was added, followed by 16 g potassium carbonate and the mixture stirred for an additional 6 hours. The reaction mixture was then poured into 3 l of water to produce a solid product which was washed five times with water and three times with methanol. The product (50 g, 92.1% yield) in the form of a white powder was recrystallised from acetonitrile to yield white crystals of 1,2-bis-(3,4-dicyanophenoxy) benzene having the formula:

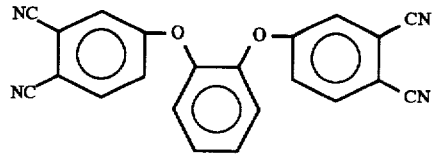

The melting point of this product was 190.1°–190.6° C. Elemental analysis of $C_{22}H_{10}N_4O_2$ was calc.: C, 72.92%; H, 2.76%; N, 15.67%; found: C, 72.83%; H, 2.76%; N, 15.57%.

EXAMPLE 2

Preparation of 1,2-bis-(2,3-dicyanophenoxy) benzene

The same apparatus as was used in Example 1 was also used in this example. 3 g (0.0173 moles) of 3-nitrophthalonitrile, was dissolved in 15 ml of anhydrous dimethyl sulphoxide in the three-necked flask. 0.95 g (0.00863 moles) of catechol and 2 g of potassium carbonate were added to the reaction mixture. The mixture was stirred at room temperature with a stream of dry, oxygen-free nitrogen passing through the flask for 26 hours. The product was isolated by pouring the reaction mixture into 300 ml of water. The resultant solid precipitate was filtered and washed until the effluent was neutral. The product (which was an off-white powder) was recrystallized from methanol/acetonitrile (20/80) to yield off-white crystals of 1,2-bis-(2,3-dicyanophenoxy) benzene having the formula:

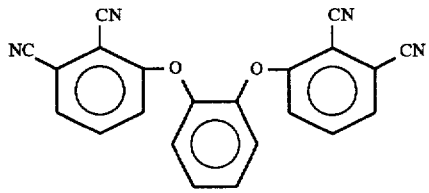

The melting point was 158°–159° C. The elemental analysis for $C_{22}H_{10}N_4O_2$ was calc.: C, 72.92%; H, 2.76%; N, 15.67%; found: C, 72.57%; H, 2.72%; N, 15.43%.

EXAMPLE 3

Preparation of 1,2-bis-(3,4-dicyanophenoxy)-3,5-ditertiarybutylbenzene 3.60 g (0.02 moles plus 0.14 g excess) of 4-nitrophthalonitrile was dissolved in 50 ml anhydrous DMSO in a 100 ml three-necked flask fitted with a magnetic stirrer bar, nitrogen-gas inlet and thermometer. 2.22 g (0.01 moles) of 3,5-ditertiarybutylcatechol (supplied by Fluka) was added to the mixture followed by 5 g of anhydrous potassium carbonate. The mixture was stirred at room temperature for 24 hours and the mixture was precipitated into 400 ml water. The white solid product was washed three times with water and a further three times with methanol to yield 4.70 g (99.1% of theoretical yield) of a snow-white product which was further recrystallized from acetonitrile to yield 4.1 g of product with the formula:

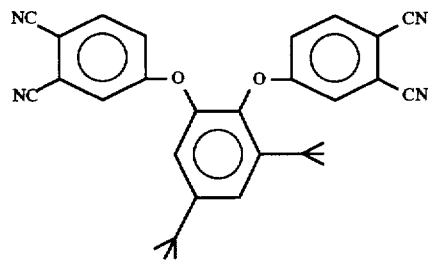

The melting point of this product was 247°–248° C. The elemental analysis for $C_{30}H_{26}N_4O_2$ was calc.: C, 75.94%; H, 5.48%; N, 11.81%; found: C, 76.07%; H, 5.51%; N, 11.86%.

EXAMPLE 4

Preparation of 2,3-bis-(3,4-dicyanophenoxy)naphthalene 3.60 g (0.02 moles plus 0.14 g excess) of 4-nitrophthalonitrile was dissolved in 50 ml anhydrous DMSO in a 100 ml three-necked flask fitted with a magnetic stirrer bar, nitrogen-gas inlet and thermometer. 1.60 g (0.01 moles) of 2,3-dihydroxynaphthalene (supplied by Aldrich) was added to the mixture followed by 5 g of anhydrous potassium carbonate. The reaction mixture was stirred at room temperature for 24 hours and then poured into 500 ml water. The off-white product was filtered off and washed with water until the washings were neutral, and then with methanol to yield 4.12 g (99.2% of theoretical yield) of crude tetranitrile which was further recrystallized from 240 ml acetonitrile. The product had the formula:

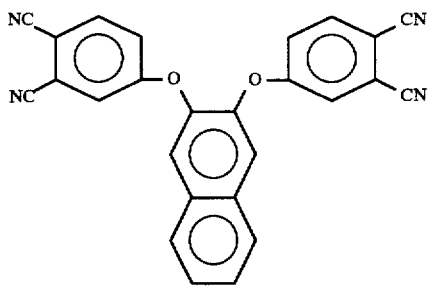

and a melting point of 265°–266° C. The elemental analysis for $C_{26}H_{12}N_4O_2$ was calc.: C, 75.72%; H, 2.91%; N, 13.59%; found: C, 75.50%; H, 2.89%; N, 13.51%.

EXAMPLE 5

Preparation of 1,2-bis-(3,4-dicyanophenoxy)-3-methylbenzene 3.60 g (0.02 moles plus 0.14 g excess) of 4-nitrophthalonitrile was dissolved in 50 ml anhydrous DMSO in a 100 ml three-necked flask fitted with a magnetic stirrer bar under nitrogen. 1.24 g (0.01 moles) of 3-methylcatechol (Aldrich) was added to the mixture followed by 5 g of anhydrous potassium carbonate. The reaction mixture was stirred at room temperature for 24 hours and then precipitated into 400 ml water. The yellow solid was washed with water until the washings were neutral. The wet product was recrystallized twice from methanol/acetonitrile (4:1) to yield 2.80 g of pure white tetranitrile and 0.35 g of a less pure product (83.8% theoretical yield). The product had the formula:

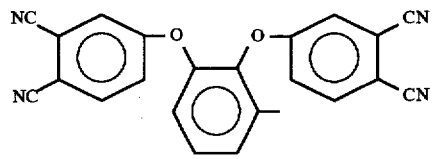

The melting point was 194.3°–195.3° C. The elemental analysis for $C_{23}H_{12}N_4O_2$ was calc.: C, 73.40%; H, 3.19%; N, 14.89%; found: C, 73.38%; H, 3.16%; N, 14.95%.

EXAMPLE 6

Preparation of 1,2-bis-(3,4-dicyanophenoxy)-4-methylbenzene 3.60 g (0.02 moles plus 0.14 g excess) of 4-nitrophthalonitrile was dissolved in 50 ml anhydrous DMSO in a 100 ml three-necked flask fitted with a magnetic stirrer bar under nitrogen. 1.24 g (0.01 moles) of 4-methylcatechol (Aldrich) was added to the mixture followed by 5 g of anhydrous potassium carbonate. The mixture was stirred at room temperature for 24 hours. The workup was as described in Example 5 and yielded 3.08 g of off-white crystals of the title compound (81.2% theoretical yield). The product had the formula:

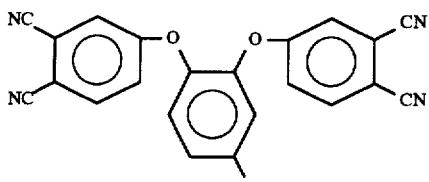

The melting point was 194°–195° C. The elemental analysis for $C_{23}H_{12}N_4O_2$ was calc.: C, 73.40%; H, 3.19%; N, 14.89%; found: C, 73.31%; H, 3.15%; N, 14.99%.

EXAMPLE 7

Preparation of 1,2-bis-(3,4-dicyanophenoxy)-4-tert-butylbenzene

The experimental procedure and reaction conditions were the same as described for Examples 5 and 6. Reagents used were 3.60 g (0.02 moles plus 0.14 g excess) of 4-nitrophthalonitrile and 1.66 g (0.01 moles) of 4-tert-butylcatechol (Aldrich). After workup and recrystallization 3.2 g (76.55% theoretical yield) of off-white crystals of the title compound were obtained. The product had the formula:

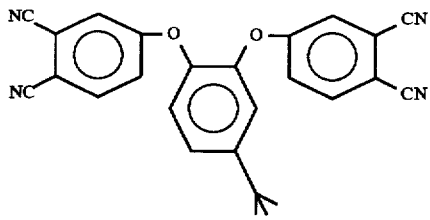

The melting point was 161°–162° C. The elemental analysis for $C_{26}H_{18}N_4O_2$ was calc.: C, 74.64%; H, 4.30%; N, 13.39%; found: C, 74.55%; H, 4.25%; N, 13.39%.

EXAMPLE 8

Preparation of 1,2-bis-(3,4-dicyanophenoxy)-3-fluorobenzene 3.60 g (0.02 moles plus 0.14 g excess) of 4-nitrophthalonitrile was dissolved in 50 ml anhydrous DMSO in a 100 ml three-necked flask fitted with a magnetic stirrer bar under nitrogen. 1.28 g (0.01 moles) of 3-fluorocatechol (Aldrich) was added to the mixture followed by 5 g of anhydrous potassium carbonate. The mixture was stirred at room temperature for 24 hours. The workup was as described in Example 5 and yielded 3.04 g of off-white crystals of the title compound (80% theoretical yield). The product had the formula:

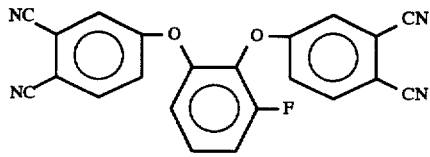

The melting point was 198.5°–199.5° C. The elemental analysis for $C_{22}H_9FN_4O_2$ was calc.: C, 69.47%; H, 2.36%; N, 14.73%; found: C, 69.47%; H, 2.34%; N, 14.80%.

EXAMPLE 9

General procedure for the hydrolysis of 1,2-bis(3,4-cyanophenoxy)benzenes 0.1 moles of a 1,2-bis(3,4-cyanophenoxy)benzene (tetranitrile) was suspended in 100 g of a 50 wt % aqueous solution of potassium hydroxide. Then 100 ml (or more if needed to wet the solid) of methanol was added. The mixture was boiled under reflux. Within the first 2–4 hours, the solid tetranitrile dissolved. The reflux was continued until the evolution of ammonia has ceased. The solution was then diluted with deionized water to 1.5–2 liters and acidified with concentrated hydrochloric acid to a pH of 1.5–2. The solid tetraaccid was filtered off and washed with deionized water until neutral and no chloride ions could be detected. Then the tetraacid product with formula:

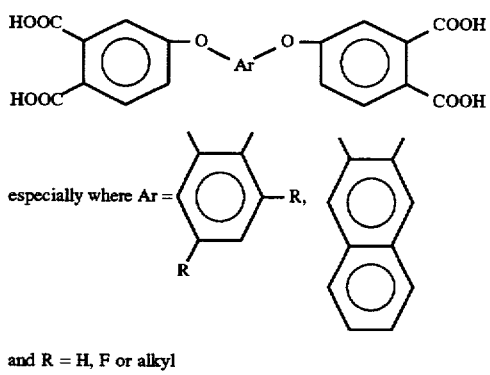

and R = H, F or alkyl was dried. Yields were generally in the range 92–98% of theoretical, products were not characterized in detail. Acids synthesized from the teranitriles cited in Examples 1 to 9 are listed in Table 1.

EXAMPLE 10

Preparation of 1,2-bis(3,4-dicarboxyphenoxy)benzene dianhydride 53.9 g (0.123 moles) of 1,2-bis-(3,4-dicarboxyphenoxy) benzene (Example 9a), prepared from the corresponding tetranitrile (Example 1) as described in Example 9, was suspended in 300 ml of warm glacial acetic acid and 300 ml of acetic anhydride was added. The mixture was boiled under reflux for 30 min. and left to crystallize overnight. The recovered needles of crystalline bisanhydride were recrystallized from 200 ml of acetic anhydride to yield 41 g of off-white long needles of the anhydride with the formula:

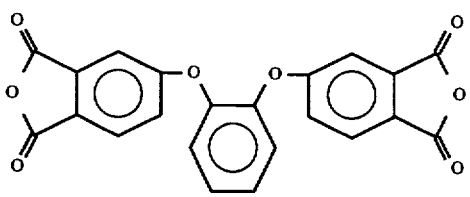

which had a melting point of 187.1°–187.6° C. The elemental analysis for $C_{22}H_{10}O_8$ was calc.: C, 65.67%; H, 2.48%; found: C, 65.69%; H, 2.45%.

EXAMPLE 11

Preparation of 1,2-bis(3,4-dicarboxyphenoxy) naphthalene dianhydride 3.47 g (0.007 moles) of 2,3-bis-(3,4-dicarboxyphenoxy) naphthalene (Example 9h), synthesized according to the procedure described in Example 9 from the tetranitrile synthesized in Example 4, was suspended in 15 ml of acetic acid and brought to the boil. 100 ml of acetic anhydride was added in aliquots and the mixture boiled gently for 40 min. After leaving overnight to cool the white crystals which precipitated were filtered off and dried in a vacuum oven at 140° C. to yield 3.05 g (95% of theoretical yield) of the bisanhydride having the formula:

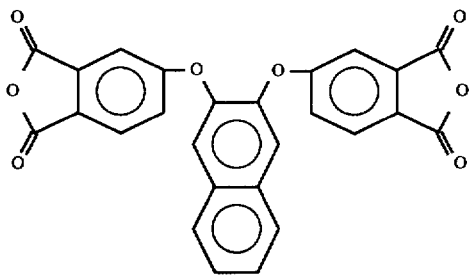

with a melting point of 264.6°–265.4° C. The elemental analysis for $C_{26}H_{12}O_8$ was calc.: C, 69.02%; H, 2.65%; found: C, 68.95%; H, 2.57%.

EXAMPLE 12

Preparation of 1,2-bis-(3,4-dicarboxyphenoxy)-3,5-ditertiarybutylbenzene dianhydride The tetranitrile described in Example 3, after hydrolysis (Example 9f) was converted into the title anhydride using the same procedure as that described in Example 10. The anhydride, with formula

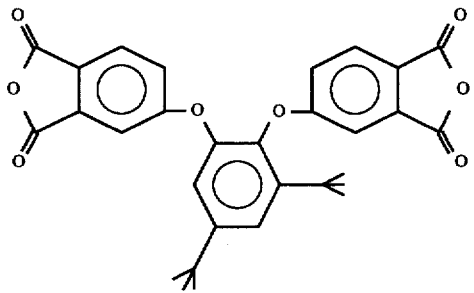

was recrystallized from acetonitrile/acetic anhydride (6:1 v/v). Analytical data, yield and melting point are given in Table 2.

EXAMPLE 13

Preparation of 1,2-bis-(3,4-dicarboxyphenoxy)-3-methylbenzene dianhydride

The product tetranitrile from Example 5, after hydrolysis (Example 9c), was converted to the title dianhydride using the procedure described in Example 10. The dianhydride of formula

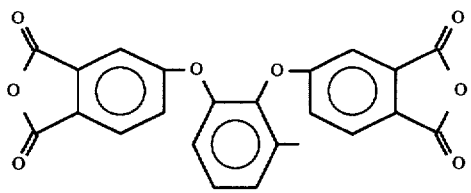

was recrystallized from acetonitrile/acetic anhydride (1:1 v/v). Analytical data, yield and melting point are given in Table 2.

EXAMPLE 14

Preparation of 1,2-bis-(3,4-dicarboxyphenoxy)-4-methylbenzene dianhydride

The product tetranitrile from Example 6, after hydrolysis (Example 9d), was converted to the title dianhydride using the procedure described in Example.10. The dianhydride of formula

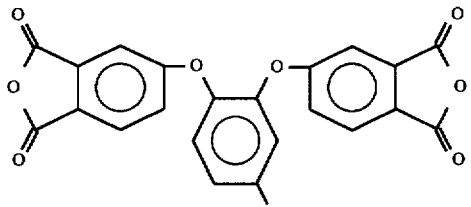

was recrystallized from acetonitrile/acetic anhydride (3:1 v/v). Analytical data, yield and melting point are given in Table 2.

EXAMPLE 15

Preparation of 1,2-bis-(3,4-dicarboxyphenoxy)-4-tert-butylbenzene dianhydride

The product tetranitrile from Example 7, after hydrolysis (Example 9e), was converted to the title dianhydride using the procedure described in Example 10. The dianhydride of formula

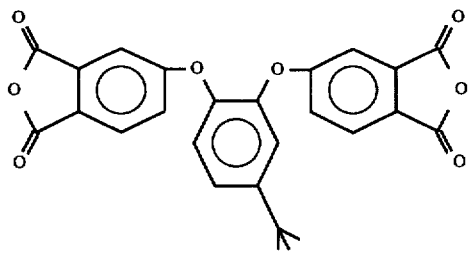

was recrystallized from acetonitrile/acetic anhydride (9:1 v/v). Analytical data, yield and melting point are given in Table 2.

EXAMPLE 16

Preparation of 1,2-bis-(3,4-dicarboxyphenoxy)-3-fluorobenzene dianhydride

The product tetranitrile from Example 8, after hydrolysis (Example 9g), was converted to the title dianhydride using the procedure described in Example 10. The dianhydride of formula

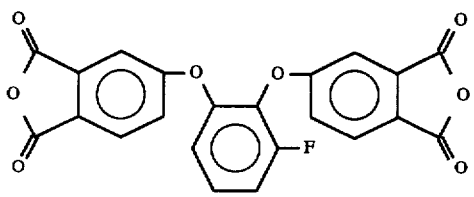

was recrystallized from acetonitrile/acetic anhydride (10:1 v/v). Analytical data, yield and melting point are given in Table 2.

POLYMER SYNTHESES

Poly(ether imide)s derived from the catechol-based dianhydrides synthesized in Examples 10–16 were all synthesized by a common procedure described in full in Example 17; any variations are cited in the specific example. The diamines used in the several syntheses are identified by a code in the titles of the Examples and by their structural formulae in Table 3. The characterization details of the polymers and copolymers prepared are given in Tables 4 and 5 and in these and other tables the dianhydrides used are identified by a code given with the systematic names of the anhydrides in Examples 17–45.

EXAMPLE 17

Preparation of polymer from 1,2-bis(3,4-carboxphenoxy) benzene dianhydride (CBA) and m-Phenylene Diamine (MPD)

2.702 g (0.025 moles) of sublimed m-phenylene diamine (Fluka) was dissolved in 100 ml of anhydrous dimethyl acetamide (DMAC) in a flask fitted with a magnetic stirrer bar. 10.05 g (0.025 moles) of 1,2-bis(3,4-carboxyphenoxy) benzene dianhydride (CBA) (synthesized in Example 10 from the tetranitrile synthesized in Example 1 and anhydride in Example 9a) was added, in one portion, with stirring at room temperature. After 20 hours the viscous solution was imidized with 40 ml of a 50:50 mixture of acetic anhydride and pyridine. The mixture was allowed to stand, with stirring, for 6 hours. The mixture was then precipitated into 4 l of methanol and was boiled in methanol to remove residual solvent. The polymer was filtered off and dried, redissolved in 100 ml of chloroform and reprecipitated. The final yield was 11.9 g of a white polymer soluble in chlorinated hydrocarbons ($CH_2Cl_2$, $CHCl_3$), DMAC, NMP and cresol. The polymer had molecular weights $\overline{M}_n=11,700$, $\overline{M}_w=44,000$ and $M_{peak}=62,000$ g mol$^{-1}$, determined by gel permeation chromatography. The glass-transition temperature of the polymer is given in Table 4. When molten at 360° C. long fibres could be pulled from the melt.

EXAMPLE 18

Preparation of polymer from 1,2-bis(3,4-carboxyphenoxy)benzene dianhydride (CBA) and p-Phenylene diamine (PPD)

The polymer was prepared from 0.001 moles of PPD (Aldrich Chem. Co.) and 0.001 moles of CBA according to the procedure described in Example 17 except that the polymer precipitated on imidization. The product was boiled in methanol; details of the product are given in Table 4.

EXAMPLE 19

Preparation of polymer from 1,2-bis(3,4-carboxyphenoxy)benzene dianhydride (CBA) and 4,4'-diaminophenyl ether (ODA)

0.200 g (0.001 moles) of 4,4'-diaminophenyl ether (ultra pure, ex BP) was dissolved in 5 ml of anhydrous DMAC in a flask fitted with a magnetic stirrer bar. 0.402 g (0.001 moles) of 1,2-bis(3,4-carboxyphenoxy)benzene dianhydride (synthesized according to Example 11) was added, in one portion, with stirring at room temperature. After 20 hours the viscous solution was imidized with 1.4 ml of a 50:50 mixure of acetic anhydride and pyridine, to yield 0.56 g of a lemon-coloured polymer soluble in chlorinated hydrocarbons ($CH_2Cl_2$, $CHCl_3$), DMAC, NMP and cresol. The polymer had a glass-transition temperature of 208° C.

EXAMPLE 20

Preparation of polymer from 1,2-bis(3,4-carboxyphenoxy)benzene dianhydride (CBA) and 3,4'-diaminophenyl ether (3,4-ODA)

The polymer was prepared from 0.001 moles of 3,4-ODA (Kennedy and Klim) and 0.001 moles of CBA according to the procedure described in Example 17; details of the product are given in Table 4.

EXAMPLE 21

Preparation of polymer from 1,2-bis(3,4-carboxyphenoxy)benzene dianhydride (CBA) and TPE-Q The polymer was prepared from 0.001 moles of TPE-Q (Kennedy and Klim) and 0.001 moles of CBA according to the procedure described in Example 17. After three hours imidization the polymer formed a gel which was extracted by boiling with methanol; details of the product are given in Table 4.

EXAMPLE 22

Preparation of polymer from 1,2-bis(3,4-carboxyphenoxy)benzene dianhydride (CBA) and TPE-R The polymer was prepared from 0.001 moles of TPE-R (Kennedy and Klim) and 0.001 moles of CBA according to the procedure described in Example 17. After three hours imidization the system formed into an opaque gel which was extracted by boiling with methanol; details of the product are given in Table 4.

EXAMPLE 23

Preparation of polymer from 1,2-bis(3,4-carboxyphenoxy)benzene dianhydride (CBA) End BAPB The polymer was prepared from 0.001 moles of BAPB (Kennedy and Klim) and 0.001 moles of CBA according to the procedure described in Example 17. After imidizing for two hours the polymer precipitated and was washed with boiling methanol; details of the product are given in Table 4.

EXAMPLE 24

Preparation of polymer from 1,2-bis(3,4-carboxyphenoxy)benzene dianhydride (CBA) and tetramethylphenylene diamine (TMpPD)

The polymer was prepared from 0.001 moles of TMpPD (Aldrich Chem. Co.) and 0.001 moles of CBA according to the procedure described in Example 17. The polymer remained in solution on imidization; details of the product are given in Table 4.

EXAMPLE 25

Preparation of polymer from 1,2-bis(3,4-carboxyphenoxyl benzene dianhydride (CBA) and 3,3',5,5'-tetramethylbenzidine (TMB)

0.243 g (0.001 moles) of 3,3',5,5'-tetramethylbenzidine (Aldrich Chem. Co. ) was dissolved in 5 ml of anhydrous DMAC in a flask fitted with a magnetic stirrer bar. 0.402 g (0.001-moles) of 1,2-bis(3,4-carboxyphenoxy)benzene dianhydride was added, in one portion, with stirring at room temperature. After 20 hours the viscous Solution was imidized with 1.4 ml of a 50:50 mixure of acetic anhydride and pyridine to yield 0.60 g of a polymer soluble in chlorinated hydrocarbons $CHCl_3$, DMAC, NMP and cresol.

EXAMPLE 26

Preparation of polymer from 1,2-bis(3,4-carboxyphenoxy)benzene dianhydride (CBA) and BAP The polymer was prepared from 0.001 moles of BAP (Kennedy and Klim Inc. ) and 0.001 moles of CBA according to the procedure described in Example 17; details of the product are given in Table 4.

EXAMPLE 27

Preparation of polymer from 1,2-bis (3,4-carboxyphenoxy)benzene dianhydride (CBA) and BAAF The polymer was prepared from 0.001 moles of BAAF (British Petroleum) and 0.001 moles of CBA according to the procedure described in Example 17; details of the product are given in Table 4.

EXAMPLE 28

Preparation of polymer from 1,2-bis(3,4-carboxyphenoxy)benzene dianhydride (CBA) and MBXD The polymer was prepared from 0.001 moles of MBXD (Kennedy and Klim Inc. ) and 0.001 moles of CBA according to the procedure described in Example 17; details of the product are given in Table 4.

EXAMPLE 29

Preparation of polymer from 1,2-bis(3,4-carboxyphenoxy (benzene dianhydride (CBA) and DApTP The polymer was prepared from 0.001 moles of DApTP (Lancaster Synthesis) and 0.001 moles of CBA according to the procedure described in Example 17. During imidization the polymer precipitated out as an opaque gel; details of the product are given in Table 4.

EXAMPLE 30

Preparation of polymer from 1,2-bis(3,4-carboxyphenoxy)-3-methylbenzene dianhydride (3-MCBA) and ODA The polymer was prepared from 0.001 moles of ODA and 0.001 moles of 3-MCBA (synthesized as in Example 13 from the tetranitrile synthesized in Example 5 and hydrolysed according to the procedure in Example 10) according to the procedure described in Example 17; details of the product are given in Table 4.

EXAMPLE 31

Preparation of polymer from 1,2-bis(3,4-carboxyphenoxy)-4-methylbenzene dianhydride (4-MCBA) and ODA The polymer was prepared from 0.001 moles of ODA and 0.001 moles of 4-MCBA (synthesized as in Example 14 from the tetranitrile synthesized in Example 6 and hydrolysed according to the procedure in Example 10) according to the procedure described in Example 17; details of the product are given in Table 4.

EXAMPLE 32

Preparation of polymer from 1,2-bis(3,4-carboxyphenoxy)-4-tert-butylbenzene dianhydride (4-tBCBA) add ODA The polymer was prepared from 0.001 moles of ODA and 0.001 moles of 4-tBCBA (synthesized as in Example 15 from the tetranitrile synthesized in Example 7 and hydrolysed according to the procedure in Example 10) according to the procedure described in Example 17; details of the product are given in Table 4.

EXAMPLE 33

Preparation of polymer from 1,2-bis(3,4-carboxyphenoxy)-3,5-ditert-butylbenzene dianhydride (3,5-tBCBA) and ODA The polymer was prepared from 0.001 moles of ODA and 0.001 moles of 3,5-tBCBA (synthesized as in Example 12 from the tetranitrile synthesized in Example 6 and hydrolysed according to the procedure in Example 3) according to the procedure described in Example 17; details of the product are given in Table 4.

EXAMPLE 34

Preparation of polymer from 1,2-bis(3,4-carboxyphenoxy)-3-fluorobenzene dianhydride (3-(CBA) and ODA The polymer was prepared from 0.001 moles of ODA and 0.001 moles of 3-FCBA (synthesized as in Example 16 from the tetranitrile synthesized in Example 6 and hydrolysed according to the procedure in Example 8) according to the procedure described in Example 17; details of the product are given in Table 4.

EXAMPLE 35

Preparation of polymer from 2,3-bis(3,4-carboxyphenoxy) naphthalene dianhydride (2,3-NBA) and ODA The polymer was prepared from 0.001 moles of 2,3-NBA and 0.001 moles of 2,3-NBA (synthesized as in Example 11 from the tetranitrile synthesized in Example 6 and hydrolysed according to the procedure in Example 4) according to the procedure described in Example 17; details of the product are given in Table 4.

EXAMPLE 36

Preparation of polymer from (1,2-bis(3,4-carboxyphenoxy)-3-methylbenzene dianhydride (3-MCBA) and MPD The polymer was prepared from 0.001 moles of MPD and 0.001 moles of 3-MCBA according to the procedure described in Example 17; details of the product are given in Table 4.

EXAMPLE 37

Preparation of polymer from 1,2-bis(3,4-carboxyphenoxy-3-methylbenzene dianhydride (3-MCBA) and TPE-Q The polymer Was prepared from 0.001 moles of TPE-Q and 0.001 moles of 3-MCBA according to the procedure described in Example 17; details of the product are given in Table 4.

EXAMPLE 38

Preparation of polymer from 1,2-bis(3,4-carboxyphenoxy)-4-methylbenzene dianhydride (4-MCBA) and TPE-Q The polymer was prepared from 0.001 moles of TPE-Q and 0.001 moles of 4-MCBA according to the procedure described in Example 17; details of the product are given in Table 4.

EXAMPLE 39

Preparation of polymer from 1,2-bis(3,4-carboxyphenoxy)-3,5-ditert-butylbenzene dianhydride (3,5-tBCBA) and PPD The polymer was prepared from 0.001 moles of PPD and 0.001 moles of 3,5-tBCBA according to the procedure described in Example 17; details of the product are given in Table 4.

EXAMPLE 40

Preparation of polymer from 2,3-bis(3,4-carboxyphenoxy)naphthalene dianhydride (2,3-NBA) and MPD The polymer was prepared from 0.001 moles of MPD and 0.001 moles of 2,3-NBA according to the procedure described in Example 17; details of the product are given in Table 4.

EXAMPLE 41

Preparation of polymer from 2,3-bis(3,4-carboxyphenoxy)naphthalene dianhydride (2,3-NBA) and BAPB The polymer was prepared from 0.001 moles of BAPB and 0.001 moles of 2,3-NBA according to the procedure described in Example 17; details of the product are given in Table 4.

EXAMPLE 42

Preparation of polymer from 2,3-bis (3,4-carboxyphenoxy)naphthalene dianhydride (2,3-NBA) and MBXD The polymer was prepared from 0.001 moles of MBXD and 0.001 moles of 2,3-NBA according to the procedure described in Example 17; details of the product are given in Table 4.

EXAMPLE 43

Preparation of copolymer from 1,2-bis(3,4-carboxyphenoxy)benzene dianhydride (CBA) and MPD (0.9) and PPD (0.1)

0.0225 moles of MPD and 0.0025 moles of PPD were dissolved together in 100 ml of anhydrous dimethyl acetamide (DMAC) in a flask fitted with a magnetic stirrer bar. 0.025 moles of CBA was added, in one portion, with stirring at room temperature. After 20 hours the viscous solution was imidized and the copolymer recovered as described in Example 10.

EXAMPLE 44

Preparation of copolymer from 1,2-bis(3,4-carboxyphenoxy)benzene dianhydride (CBA) and MPD (0.7) and PPD (0.3)

A copolymer was prepared from 0.0175 moles of MPD, 0.0075 moles of PPD and 0.025 moles of CBA according to the procedure described in Example 43. After one hour imidization the system formed into a gel.

EXAMPLE 45

Preparation of copolymer from 1,2-bis(3,4-carboxyphenoxy)benzene dianhydride (CBA) and MPD (0.5) and PPD (0.5)

A copolymer was prepared from 0.0125 moles of MPD, 0.0125 moles of PPD and 0.025 moles of CBA according to the procedure described in Example 43. A gel formed after one hour of imidization.

COMPARATIVE POLYMERS

For comparative purposes samples of bis(ether anhydride) s HBA and RBA were prepared from hydroquinone and resorcinol, respectively, following the above procedures. First the tetranitriles were prepared by nitrodisplacement with 4-nitrophthalonitrile using the same procedures as that described in Example 1. The tetranitriles were then converted to tetraacids and hence to the anhydrides according to Examples 9 and 10. Analytical data for the tetranitriles and anhydrides were consistent with theory and with data reported previously by Takekoshi (T. Takekoshi, J. Polym. Sci., Polym. Symp., 1986 74 93). Polymers prepared from the anhydrides are described in the following comparative examples.

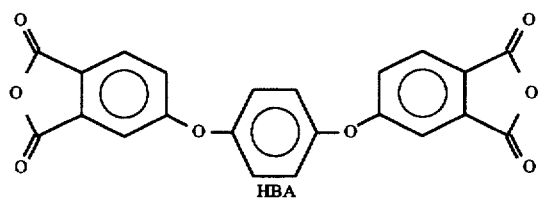

HBA

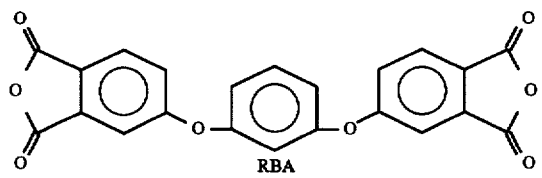

RBA

COMPARATIVE EXAMPLE A

Preparation of polymer from 1,4-bis(3,4-carboxyphenoxy)benzene dianhydride (HBA) and MPD The polymer was prepared from 0.001 moles of MPD and 0.001 moles of HBA according to the procedure described in Example 17. During imidization the polymer formed a lump of gel and was extracted by boiling with methanol; details of the product are given in Table 5.

COMPARATIVE EXAMPLE B

Preparation of polymer from 1,3-bis(3,4-carboxyphenoxy)benzene dianhydride (RBA) and MPD The polymer was prepared from 0.001 moles of MPD and 0.001 moles of RBA according to the procedure described in Example 17. During imidization the polymer precipitated out and was extracted by boiling with methanol; details of the product are given in Table 5.

COMPARATIVE EXAMPLE C

Preparation of polymer from 1,4-bis(3,4-carboxyphenoxy)benzene dianhydride (HBA) and ODA The polymer was prepared from 0.001 moles of ODA and 0.001 moles of HBA according to the procedure described in Comparative Example B. The polymer precipitated out on imidization and was extracted by boiling with methanol; details of the product are given in Table 5.

COMPARATIVE EXAMPLE D

Preparation of polymer from 1,3-bis(3,4-carboxyphenoxy)benzene dianhydride (RBA) and ODA The polymer was prepared from 0.001 moles of ODA and 0.001 moles of RBA according to the procedure described in Comparative Example B; details of the product are given in Table 5.

COMPARATIVE EXAMPLE E

Preparation of low-molecular-weight polymer from 1,4-bis(3,4-carboxyphenoxy)benzene dianhydride (HBA) and MPD The polymer was prepared from 0.025 moles of MPD and 0.02375 moles of HBA according to the procedure described in Comparative Example B except that the polymer remained in solution on imidization and was extracted as in Example 1. Details of the product are given in Table 5. The stoichiometric imbalance was used in order to produce a polymer of lower molecular weight in order to try to produce a polymer of greater solubility according to the standard principles of step polymerization.

COMPARATIVE EXAMPLE F

Preparation of polymer from 1,4-bis(3,4-carboxyphenoxy)benzene dianhydride (HBA) and TPE-R The polymer was prepared from 0.001 moles of TPE-R and 0.001 moles of HBA according to the procedure described in Comparative Example B; details of the product are given in Table 5.

COMPARATIVE EXAMPLE G

Preparation of polymer from 1,4-bis(3,4-carboxyphenoxy)benzene dianhydride (HBA) and TPE-R The polymer was prepared from 0.001 moles of TPE-R and 0.001 moles of RBA according to the procedure described in Comparative Example B; details of the product are given in Table 5.

COMPARATIVE EXAMPLE H

Preparation of polymer from 1,4-bis(3,4-carboxyphenoxy)benzene dianhydride (HBA) and BAPB The polymer was prepared from 0.001 moles of BAPB and 0.001 moles of 2,3-NBA according to the procedure described in Comparative Example B; details of the product are given in Table 5.

POLYMER MOLECULAR WEIGHTS

Molecular weights were determined by gel permeation chromatography using N,N-dimethyl formamide containing 1 molar lithium chloride as eluant and a polystyrene calibration. The molecular weights quoted as $M_{peak}$ are the molecular weights at the peak of the gel permeation chromatograms for the polymers cited

POLYMER SOLUBILITIES AND GLASS-TRANSITION TEMPERATURES

The solubilities of the polymers were determined in chloroform, N,N-dimethylformamide (DMF), dimethylacetamide (DMAC), N-methylpyrollidinone (NMP) and cresol. Solvent powers increased in the order chloroform<DMF<DMAC<NMP<cresol and in defining the polymer solubilities in the Tables the symbol s refers to solubility in all solvents used and if a single solvent is specified the polymer cited was soluble in that solvent at room temperature and in more powerful solvents according to the above order.

Glass-transition temperatures were determined on a Perkin Elmer DSC2. The temperatures determined in this work were transition onset temperatures.

The solubilities and glass-transition temperatures of some polymers based on CBA are compared with those of the corresponding polymers based on HBA and RBA with the same diamines. The data are presented in Tables 4 and 5 and are collected in Table 7.

THERMAL STABILITY

Thermal stabilities of some polymers were determined by thermogravimetric analysis. Measurements were made with the aid of a Perkin Elmer TGA7. The results are presented in Table 6.

TABLE 1

Tetraacids Prepared from Corresponding Tetranitriles in Examples 1 to 9

| Example | Acid |
|---|---|
| 9a | HOOC—[ring]—O—[ring]—O—[ring]—COOH, HOOC—, —COOH |
| 9b | HOOC—[ring]—O—[ring]—O—[ring]—COOH, COOH, COOH |
| 9c | HOOC—[ring]—O—[ring]—O—[ring]—COOH, HOOC—, —COOH |
| 9d | HOOC—[ring]—O—[ring]—O—[ring]—COOH, HOOC—, —COOH |
| 9e | HOOC—[ring]—O—[ring]—O—[ring]—COOH, HOOC—, —COOH |
| 9f | HOOC—[ring]—O—[ring]—O—[ring]—COOH, HOOC—, —COOH |

TABLE 1-continued

Tetraacids Prepared from
Corresponding Tetranitriles in Examples 1 to 9

| Example | Acid |
|---|---|
| 9g | HOOC-[benzene]-O-[benzene]-O-[benzene(F)]-[benzene]-COOH with HOOC and COOH substituents |
| 9h | HOOC-[benzene]-O-[naphthalene]-O-[benzene]-COOH with HOOC and COOH substituents |

TABLE 2

Characterization Data for Dianhydrides Based on Catechols

| Example | | Calc. | Found | Yield/% | Melting Point °C. |
|---|---|---|---|---|---|
| 12 | C | 70.03 | 69.93 | 89.6 | 147–148 |
|  | H | 5.05 | 5.25 | | |
| 13 | C | 66.3 | 66.28 | 95.7 | 208–209 |
|  | H | 2.8 | 2.84 | | |
| 14 | C | 66.3 | 66.44 | 87.7 | 179–180 |
|  | H | 2.8 | 2.81 | | |
| 15 | C | 68.12 | 68.10 | 86.1 | 158–159 |
|  | H | 3.93 | 3.90 | | |
| 16 | C | 62.86 | 62.48 | 85.43 | 177–178 |
|  | H | 2.15 | 2.57 | | |

TABLE 3

Diamines Used in Polymer Syntheses

| Code | Structure |
|---|---|
| MPD | H₂N-[benzene]-NH₂ (meta) |
| PPD | H₂N-[benzene]-NH₂ (para) |
| TMpPD | H₂N-[tetramethylbenzene]-NH₂ |
| ODA | H₂N-[benzene]-O-[benzene]-NH₂ |
| 3,4-ODA | H₂N-[benzene]-O-[benzene]-NH₂ (3,4-isomer) |
| TMB | tetramethylbiphenyl diamine |
| BAAF | H₂N-[benzene]-C(CF₃)₂-[benzene]-NH₂ |
| TPE-Q | H₂N-[benzene]-O-[benzene]-O-[benzene]-NH₂ |
| TPE-R | H₂N-[benzene]-O-[benzene]-O-[benzene]-NH₂ (meta) |
| BAPB | H₂N-[benzene]-O-[benzene]-[benzene]-O-[benzene]-NH₂ |
| BAP | H₂N-[benzene]-C(CH₃)₂-[benzene]-C(CH₃)₂-[benzene]-NH₂ |
| MBXD | H₂N-[dimethylbenzene]-CH₂-[dimethylbenzene]-NH₂ |
| DApTP | H₂N-[benzene]-[benzene]-[benzene]-NH₂ |

TABLE 4

Characteristics of Polymers

| Example | Anhydride | Diamine | M.Wt/kg mol-1 | Tg/°C. | Solubility |
|---|---|---|---|---|---|
| 17 | CBA | MPD | 112 | 220 | s |
| 18 | CBA | PPD | — | None | Insol |
| 19 | CBA | ODA | 287 | 208 | s |
| 20 | CBA | 3,4-ODA | 151 | 190 | s |
| 21 | CBA | TPR-Q | — | 192 | cresol |
| 22 | CBA | TPE-R | — | 184 | NMP |
| 23 | CBA | BAPB | 476 | 204 | s |
| 24 | CBA | TMpPD | 40 | — | s |
| 25 | CBA | TMB | — | 262, 301 | s |
| 26 | CBA | BAP | 422 | 211 | s |
| 27 | CBA | BAAF | 62 | 228 | s |
| 28 | CBA | MBXD | 214 | 243 | s |
| 29 | CBA | DApTP | — | No Tg | insol |
| 30 | 3-MCBA | ODA | — | 209 | s |
| 31 | 4-MCBA | ODA | — | 213 | s |
| 32 | 4-tBCBA | ODA | 43 | 205 | s |
| 33 | 3,5-tBCBA | ODA | — | 228 | s |
| 34 | 3-FCBA | ODA | 235 | 214 | s |
| 35 | 2,3-NBA | ODA | 36 | 230 | S |
| 36 | 3-MCBA | MPD | — | 222 | s |
| 37 | 3-MCBA | TPE-Q | — | 202 | s |
| 38 | 4-MCBA | TPE-Q | — | 194 | s |
| 39 | 3,5-tCBA | PPD | 31 | 256 | s |
| 40 | 2,3-NBA | MPD | — | 230 | s |
| 41 | 2,3-NBA | BAPB | 127 | 227 | s |
| 42 | 2,3-NBA | MBXD | 97 | 265 | s |
| 43 | CBA | MPD (0.9) | — | — | s |

TABLE 4-continued

Characteristics of Polymers

| Example | Anhydride | Diamine | M.Wt/kg mol-1 | Tg/°C. | Solubility |
|---|---|---|---|---|---|
| 44 | CBA | PPD (0.1) MPD (0.7) PPD (0.3) | 19 | 213 | NMP |
| 45 | CBA | MPD (0.5) PPD (0.5) | — | — | insoluble |

TABLE 5

Comparative Examples

| Example | Anhydride | Diamine | M.Wt/kg mol-1 | Tg/°C. | Solubility |
|---|---|---|---|---|---|
| A | HBA | MPD | | 244[a] 255[b] 242[c] | NMP[a,b,c] |
| B | RBA | MPD | | 224[b] | NMP |
| C | HBA | ODA | | 233, 239[a] 237[b] | NMP |
| D | RBA | ODA | | 209[b] | NMP (swells) |
| E | HBA | MPD | 30 | | |
| F | HBA | TPE-R | | 199[b] | NMP insoluble |
| G | RBA | TPE-R | | 188[b] | NMP (swells) |
| H | HBA | BAPB | | | cresol |

[a]Data determined in this work
[b]Data taken from the paper by T. Takekoshi, J. Polym. Sci., Polym. Symp. 1986 74 93
[c]Data taken from paper by M. Davies, J. N. Hay and B. Woodfine, High Performance Polymers, 1993 5 37

TABLE 6

Thermal Stability

| Sample | Anhydride | Amine | Weight Loss/% | Temperature Range/°C. | Temperature for 5% Weight Loss/°C. |
|---|---|---|---|---|---|
| Example 17 | CBA | MPD | 98.5 | 477–670 | — |
| Comparative Example A | HBA | MPD | 97 | 527–682 | 526[a] |
| Example 23 | CBA | BAPB | 100 | 520–676 | — |

[a]Data taken from the paper by T. Takekoshi, J. Polym. Sci., Polym. Symp., 1986 74 93

TABLE 7

Comparison of Thermal Properties and Solubilities of Polymers Based on CBA, HBA and RBA and Several Amines

| | HBA | RBA | CBA |
|---|---|---|---|
| MPD | Comparative Example A Tg/°C. = 244[a]; 2.55[b]; 242/244[c] solubility: cresol[a]; NMP[b] | Comparative Example B Tg/°C. = 224[b] solubility: cresol[a]; NMP[b] | Example 17 Tg/°C. = 220[a] solubility: chloroform[a] |
| ODA | Comparative Example C Tg/°C. = 233, 239[a]; 237[b] solubility: cresol[a]; NMP[b] | Comparative Example D Tg/°C. = 209[b] solubility: cresol[a] | Example 19 Tg/°C. = 208[a] solubility: chloroform[a] |
| BAPB | Comparative Example H solubility: insoluble[a] | | Example 23 Tg/°C. = 204[a] solubility: chloroform[a] |
| TPE-R | Comparative Example F Tg/°C. = 199, $T_m$/°C. = 330[b] solubility: insoluble[b] | Comparative Example G Tg/°C. = 199[b] solubility: swells in NMP[b] | Example 22 Tg/°C. = 184[a] solubility: NMP[a] |

[a]Data obtained in this work
[b]Data taken from the paper by T. Takekoshi, J. Polym. Sci., Polym. Symp., 1986 74 93
[c]Data taken from paper by M. Davies, J. N. Hay and B. Woodfine, High Performance Polymers, 1993 5 37

What is claimed is:

1. A compound of the formula

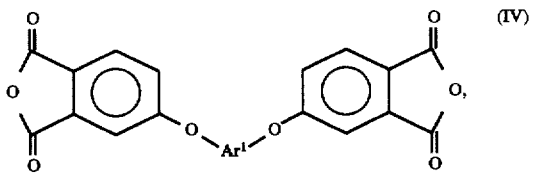

or

-continued

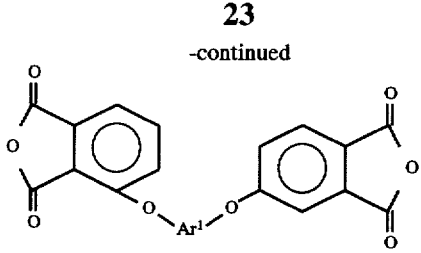

(VI)

wherein:

Ar$^1$ is 1,2-naphthylene, 2,3-naphthylene or

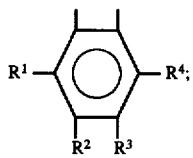

and

R$^1$, R$^2$, R$^3$, and R$^4$ are each independently hydrogen, fluorine, chlorine, alkyl containing 1 to 10 carbon atoms, or phenyl.

2. The compound as recited in claim 1 wherein said formula is (IV) or (V).

3. The compound as recited in claim 2 wherein Ar$^1$ is

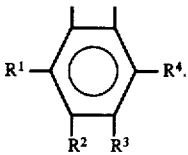

4. The compound as recited in claim 3 wherein:
R$^1$, R$^2$, R$^3$, and R$^4$ are hydrogen;
R$^1$ and R$^3$ are hydrogen and R$^2$ and R$^4$ are t-butyl;
R$^1$, R$^3$ and R$^4$ are hydrogen and R$^2$ is t-butyl;
R$^1$ is methyl and R$^2$, R$^3$ and R$^4$ are hydrogen;
R$^1$, R$^3$ and R$^4$ are hydrogen and R$^2$ is methyl; or
R$^1$ is fluorine and R$^2$, R$^3$ and R$^4$ are hydrogen.

5. The compound as recited in claim 3 wherein:
R$^1$ is alkyl and R$^2$, R$^3$ and R$^4$ are hydrogen;
R$^1$, R$^3$ and R$^4$ are hydrogen and R$^2$ is alkyl; or
R$^1$ and R$^3$ are alkyl, and R$^2$ and R$^4$ are hydrogen.

6. The compound as recited in claim 3 wherein R$^1$, R$^2$, R$^3$, and R$^4$ are hydrogen.

* * * * *